United States Patent
Hoehn et al.

(10) Patent No.: US 7,204,319 B2
(45) Date of Patent: Apr. 17, 2007

(54) JOINTED ROCKSHAFT WITH ANGULARLY ADJUSTABLE SEGMENTS

(75) Inventors: Kevin William Hoehn, Bettendorf, IA (US); John Henry Meinert, Eldridge, IA (US); Andrew Dale Sahr, Geneseo, IL (US)

(73) Assignee: Deere & Company, Moline, IL (US)

( * ) Notice: Subject to any disclaimer, the term of this patent is extended or adjusted under 35 U.S.C. 154(b) by 43 days.

(21) Appl. No.: 10/954,426

(22) Filed: Sep. 30, 2004

(65) Prior Publication Data
US 2006/0065413 A1    Mar. 30, 2006

(51) Int. Cl.
*A01B 63/00*    (2006.01)

(52) U.S. Cl. ...................... 172/482; 172/668; 172/456; 172/311

(58) Field of Classification Search ................ 172/482, 172/663, 668, 456, 776, 311
See application file for complete search history.

(56) References Cited

U.S. PATENT DOCUMENTS

| | | | |
|---|---|---|---|
| 3,460,631 A | | 8/1969 | Friesen et al. ............... 172/311 |
| 3,483,951 A | | 12/1969 | Bonesho et al. ............... 188/1 |
| 3,700,043 A | * | 10/1972 | Sullivan ..................... 172/400 |
| 3,713,495 A | * | 1/1973 | Redford ...................... 172/456 |
| 3,828,860 A | | 8/1974 | Poland ........................ 172/311 |
| 4,034,623 A | * | 7/1977 | Boone et al. .................. 74/522 |
| 4,050,522 A | | 9/1977 | Ralston et al. ............... 172/311 |
| 4,073,345 A | * | 2/1978 | Miller ......................... 172/413 |
| 4,151,886 A | * | 5/1979 | Boetto et al. ................ 172/311 |
| 4,178,998 A | * | 12/1979 | Rockwell ..................... 172/311 |
| 4,342,367 A | * | 8/1982 | Gates .......................... 172/776 |
| 4,396,069 A | | 8/1983 | Ferber et al. ................ 172/310 |
| 4,475,601 A | * | 10/1984 | Harden et al. ............... 172/283 |
| 3,536,144 A | | 4/1985 | Hood et al. .................. 172/311 |
| 4,509,602 A | | 4/1985 | Russ ........................... 172/311 |
| 5,303,779 A | | 4/1994 | Friggstad .................... 172/311 |
| 5,366,024 A | * | 11/1994 | Payne ......................... 172/318 |
| 5,988,293 A | * | 11/1999 | Brueggen et al. ........... 172/414 |
| 6,374,922 B1 | | 4/2002 | Friggstad .................... 172/322 |
| 6,374,923 B1 | | 4/2002 | Friggstad .................... 172/383 |
| 6,550,543 B1 | | 4/2003 | Friggstad .................... 172/311 |
| 6,581,530 B1 | * | 6/2003 | Hall et al. ..................... 111/52 |

OTHER PUBLICATIONS

235 Centerfold Disk OM (pp. 19-21) PDI (pp. 8-11).

* cited by examiner

*Primary Examiner*—Victor Batson

(57) ABSTRACT

A flexible rockshaft includes joint structure facilitating the adjustment of the rotational angle of rockshaft segments relative to each other. A link inserted between a rockshaft segment and the rockshaft flex member rotates on the same or a parallel pivot as adjacent rockshaft segment, and an adjustable length connecting mechanism on the link provides angular adjustment. In one embodiment, shims supported on the link are selectively clamped between a threaded stop and an internally threaded link. The number of shims may be easily varied to change the angular position of one rockshaft segment relative to the adjacent segment. In another embodiment, a simpler threaded member with positioning nuts is located on the additional link and provides inexpensive angular adjustability.

23 Claims, 5 Drawing Sheets

JOINTED ROCKSHAFT WITH ANGULARLY ADJUSTABLE SEGMENTS

FIELD OF THE INVENTION

The present invention relates generally to a rockshaft for an implement and, more specifically, to a rockshaft having two or more sections connected by a joint to provide flexibility.

BACKGROUND OF THE INVENTION

Implement frame flexibility is required for proper operating depth and consistent seed placement across a wide seeding implement. A multi-section agricultural implement frame with a segmented and jointed rockshaft is often used with such implements. An actuator attached to one segment rotates the rockshaft segments to raise and lower tools connected to the frame. In many currently available seeding and tillage implements, the rockshaft is connected to lift wheel assemblies that rotate relative to the frame with movement of the actuator to change frame height. The joints connecting rockshaft segments transmit rockshaft rotation and facilitate pivoting of the frame sections when changes in terrain are encountered or when the implement frame is folded and unfolded between field-working and transport positions. Loads on the joints can be substantial, particularly when the rockshaft is part of a lift system on large tillage and seeding implements.

To adjust the operating depth of tillage or seeding tools on one frame section relative to the tools on another section, some implements have adjustable length links located between the rockshaft and the support wheels. Other adjustment structures include an adjustable turnbuckle between the mainframe and outer section rockshafts. If additional wheel assemblies are connected to the rockshaft outboard of the inner rockshaft section, individual adjustment at each outboard wheel assembly may be required to change relative operating depth. Providing convenient, consistent and precise wheel assembly adjustments is continuing source of problems with such rockshaft assemblies.

SUMMARY OF THE INVENTION

It is therefore an object of the present invention to provide an improved flexible rockshaft structure for an implement. It is another object of the invention to provide such a rockshaft structure which overcomes most or all of the aforementioned problems.

It is a further object of the present invention to provide an improved flexible rockshaft structure which facilitates adjustment of the operating depth of tillage or seeding tools on one frame section relative to similar tools on another section. It is yet another object to provide such a rockshaft which provides consistent, repeatable and precise height adjustment.

A segmented and jointed rockshaft includes joint structure facilitating the angular adjustment of the rockshaft sections relative to each other. An additional link is inserted between a rockshaft segment and the rockshaft flex member. The additional link rotates on the same or a parallel pivot as adjacent rockshaft segment. Rotational position of the additional link relative to the rockshaft segment is controlled by a connecting mechanism. In the embodiment shown, shims supported on the additional link are selectively clamped between a threaded stop and an internally threaded link. The number of shims may be varied to change the angular position of one rockshaft segment relative to the adjacent segment. Convenient angular adjustment of the rockshaft segments is provided. One adjustment mechanism controls operating height of all frame sections outboard of the mechanism, thereby saving adjustment time and steps. The shim adjustment has discrete steps which make readjustments more consistent and predictable.

In an alternative design, a simple threaded member located on the additional link includes positioning nuts to provide inexpensive angular adjustability.

These and other objects, features and advantages of the present invention will become apparent from the description which follows taken in view of the drawings.

DESCRIPTION OF THE PREFERRED EMBODIMENT

Figure 1:
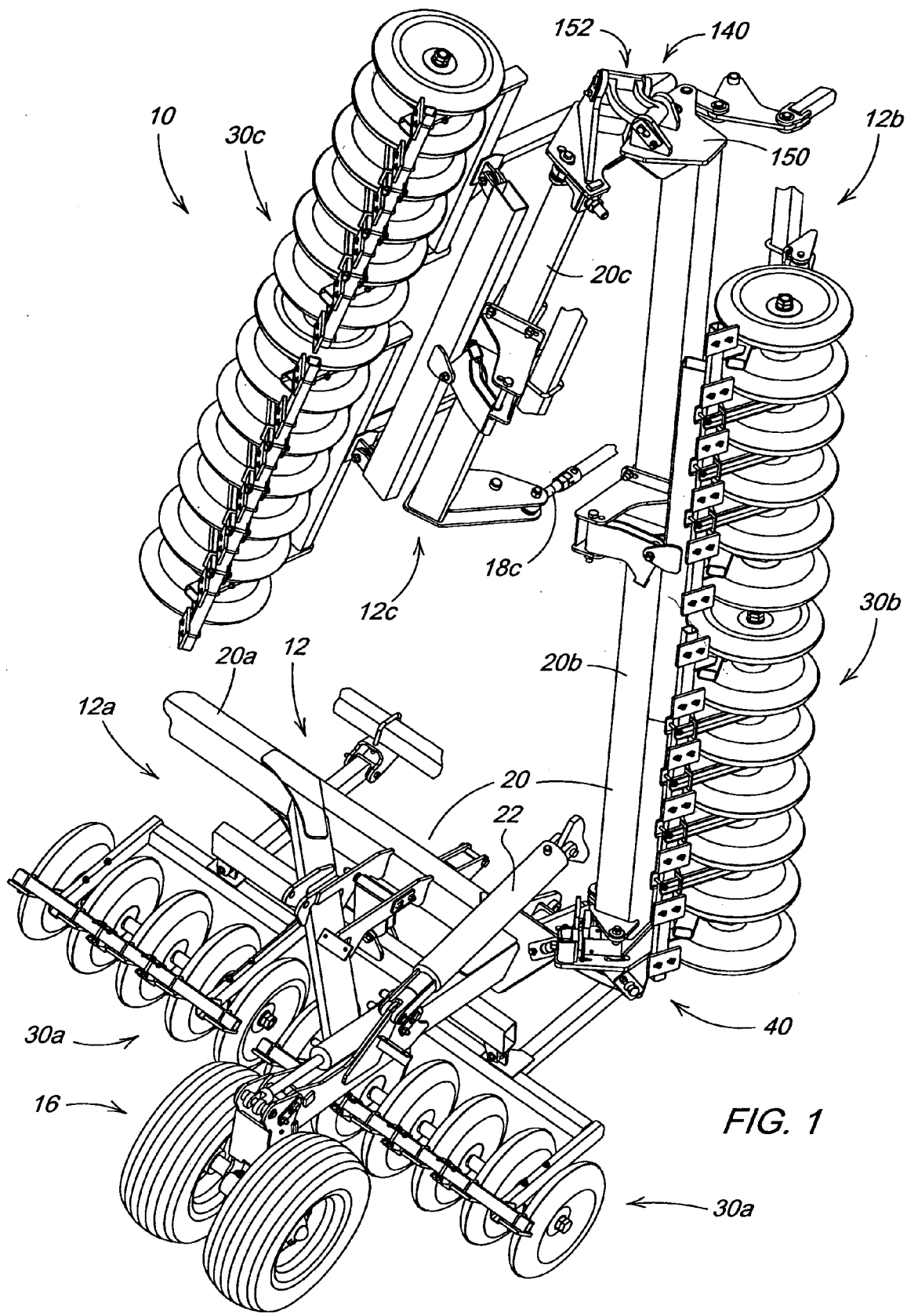
FIG. 1 is perspective view of a right-hand portion of a multi-section implement in a folded position and having a flexible rockshaft with the implement sections.
Figure 2:
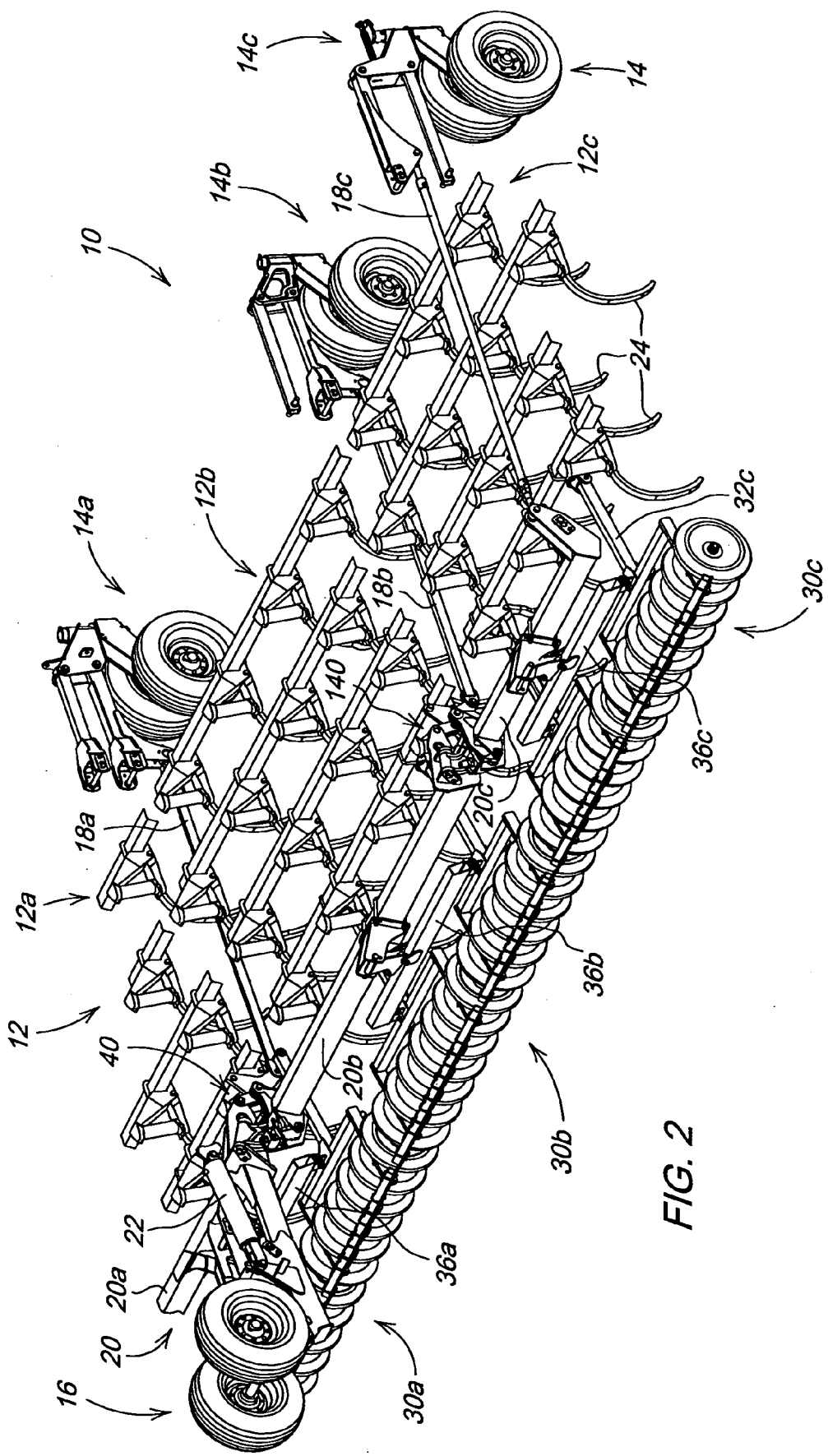
FIG. 2 is a perspective view of the portion of the implement of FIG. 1 in the field-working position with parts removed to better show the interconnections of front lift wheels with the flexible rockshaft.
Figure 3:
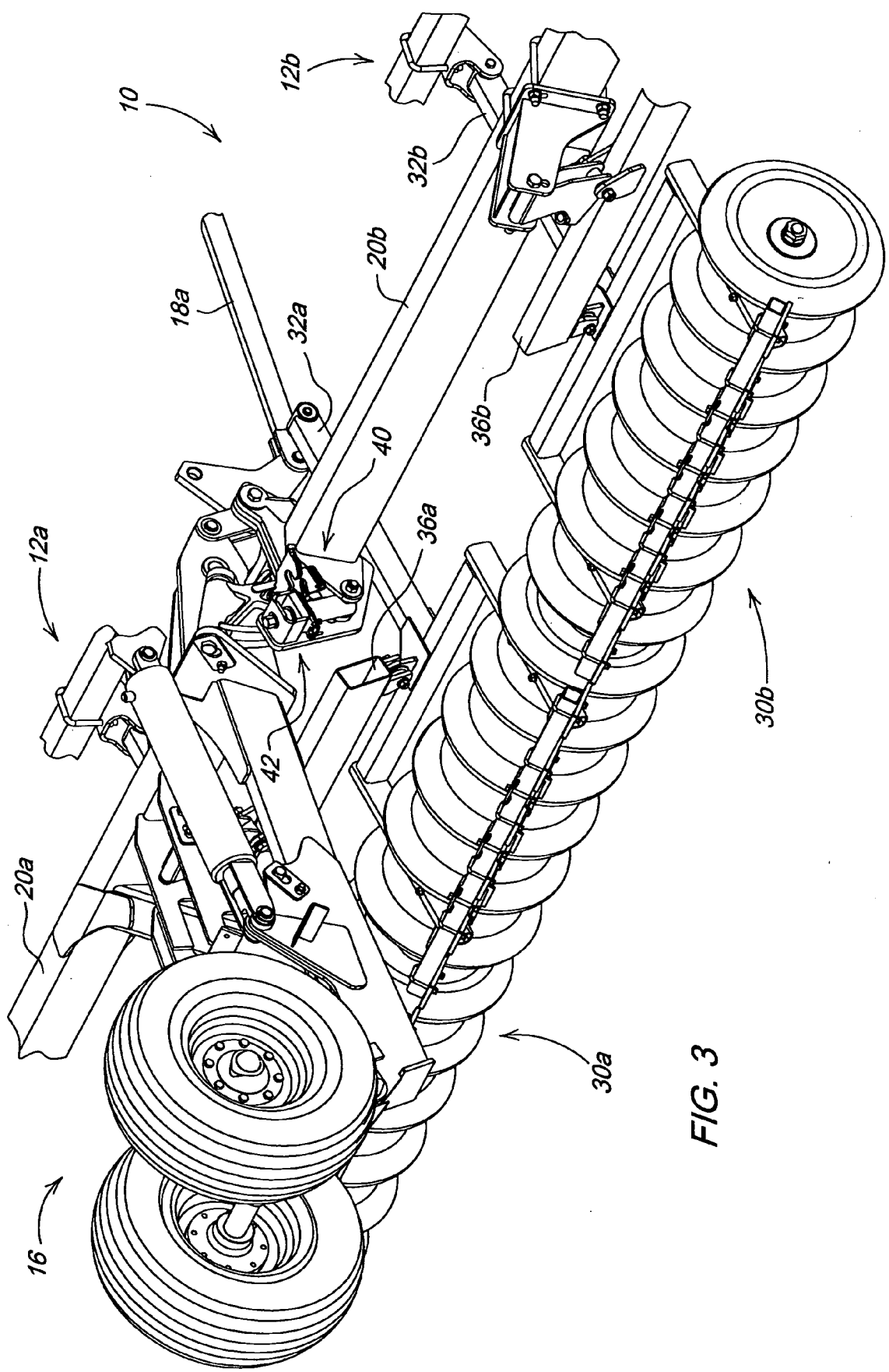
FIG. 3 is an enlarged perspective view of a portion of the implement of FIG. 1 in the field-working position.

Referring now to FIGS. 1–3, therein is shown a right-hand portion of a multi-section flexible implement 10 having a main frame 12 with a plurality of implement frame sections including sections 12a, 12b, and 12c. The frame 12 is supported for transport by front and rear ground wheel assemblies 14 and 16. A flexible rockshaft member 20 having rockshaft segments 20a, 20b, and 20c is supported from the rear of the main frame sections 12a–12c and is connected to the ground wheel assemblies 16. Links such as shown at 18a, 18b, and 18c connect the flexible rockshaft member 20 with the front ground wheel assemblies 14a, 14b and 14c. Cylinders 22 are connected between the main frame section 12a and the rockshaft member segment 20a. Operating the cylinders 22 to rotate the rockshaft member 20 in a clockwise direction rocks the wheel assemblies 14 and 16 upwardly to lower the main frame 12 to a field working position. The rear wheel assemblies 16 are raised off the ground, and depth control is provided by the front wheel assemblies 14 through the rockshaft member 20 and the links 18a–18c. To lift the frame 12 for road transport, the rockshaft member 20 is rotated in the opposite direction so the wheel assemblies 14 and 16 rock downwardly with respect to the frame 12. For field transport, the rear wheel assemblies 16 remain off the ground, but the forward wheel assemblies 14 are lowered sufficiently for tool ground clearance. The left-hand portion of the implement 10 is generally the mirror image of the right-hand portion.

A plurality of tools, shown in FIG. 2 as hoe drill openers 24, are supported from the frame 12 for opening a furrow and depositing material such as seed. Trailing press wheel gangs 30a, 30b and 30c include drawbar structures 32a, 32b and 32c pivotally connected the forwardly adjacent frame section 12a–12c for firming the soil over the material deposited in the furrows. The drawbar structures 32a–32c are connected to the rockshaft member 20 by walking beam linkages 36a–36c to provide lift and support for the gangs. The implement 10 is relatively large, and the rockshaft member 20 is subject to heavy loading. As shown in the figures, at least the outer segments of the rockshaft member 20 also act as section beams, which further increases the loading and bend forces on the member 20.

To facilitate folding and unfolding of the frame sections 12a–12c relative to each other and flexing of the frame 12 during field working operations, flexible joint structure 40 connects segments of the rockshaft member 20. The flexible joint structure 40 includes adjustment structure 42 for selectively changing the angular position of adjacent rockshaft sections, thereby facilitating implement leveling and relative frame height of the frame sections.

Figure 4:
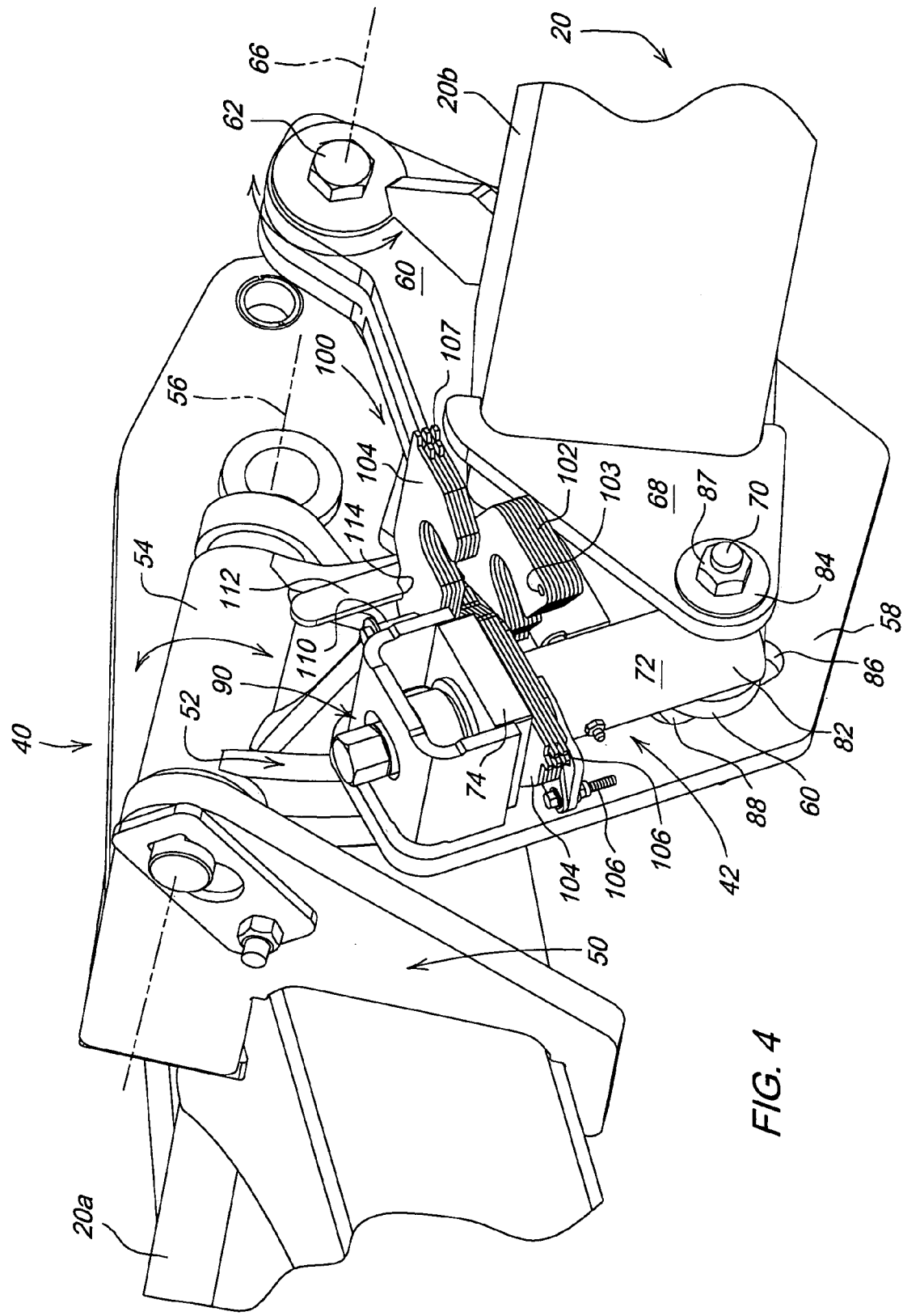
FIG. 4 is an enlarged perspective view of one of the flexible joints between the implement sections.

As best seen in FIG. 4, the flexible joint structure 40 includes a first hinge member 50 fixed to the outermost end of the rockshaft segment 20a. An adjustment hinge member 52 is connected by a pivot 54 to the first hinge member 50 for rocking relative to the rockshaft segment 20a about a generally tore-and-aft extending pivot axis 56. The hinge member 52 extends downwardly and outwardly from the pivot 54 to a connection with an upright plate 58. A second plate 60 is pivotally supported from a forward end of the plate 58 by a pivot pin 62 for rocking about an axis 66 generally parallel to the longitudinal axis of the rockshaft segment 20b. The innermost end of the rockshaft segment 20b is fixed to the outer face of the plate 60. A bracket or plate 68 fixed to the inner end of the rockshaft segment 20b projects rearwardly to a pivotal connection 70 with a lowermost portion of an adjustable length member or trunniori 72. The member 72 has an upper end connected by an outwardly projecting bracket 74 fixed to the outer face of the plate 58. By varying the length of the member 72, the angular position of the rockshaft segment 20b relative to the plate 58, and thus the relative angle between the segments 20a and 20b and at least first and second lift arms attached to the respective segments, can be adjusted.

The adjustable length member 72 shown in FIG. 4 includes a lower cylindrical portion 82, and the pivotal connection 70 includes a bolt with a bushing extending through aligned apertures in the plate 60 and the bracket 68. The bolt extends through a washer 84 and through the portion 82, and the bolt and bushing project through a slot 86 in the plate 58. A nut 87 on the bolt is tightened, so that the bolt, bushing, end washers and the nut form the equivalent of a double headed pin which is free to slide along the slot 86.

A threaded shaft 90 is rotatably supported by the bracket 74 and includes a threaded end extending into a threaded internal bore portion of the cylindrical portion 82. The upper end of the shaft 90 is hexagonal, and by inserting a tool over the end and rotating the shaft, the pivot 70 moves relative to the slot 86 to rotate the plate 68 and rockshaft segment 20b about the pivotal axis 66 and change the angle of the segment 20b relative to the segment 20a.

To provide a strong but adjustable connecting link between the plates 58 and 68 and provide a visual indicator of the angular adjustment between adjacent rockshaft segments 20a and 20b, the flexible joint structure 40 includes indexing structure 100. The indexing structure 100 includes shims 102 and 104 conforming generally to the shapes of the trunnion and bracket. Individual shims 102 and 104 are pivotally connected to the joint structure 40 and facilitate incremental adjustment of the angular position of the first rockshaft segment 20a relative to the second rockshaft section 20b by the operator. A set of factory installed shims 102 (shown offset from the member 72 in FIG. 4) have a hook-shaped configuration with apertures 103 and are supported by bolts 106 passing through the apertures. The set of shims 102 when installed around the member 90 provides initial adjustment of the length of the member 72. The total thickness of the set of factory installed shims 102 is selected to compensate for manufacturing tolerances and generally establishes the minimum length of the adjustable length member 72 for the desired angular adjustment range of the rockshaft segment 20b relative to the segment 20a.

The shims 104, which include hook-shaped ends with access tabs 107, are pivotally connected at the opposite ends to the hinge plate 58 by an upright pin 110. The shims 104 pivot about the pin 110 between a storage position (upper shims 104 in FIG. 4) offset from the adjustable length member 72 and a working position (lowermost shims 104 in FIG. 4) wherein the hooked portion generally embraces the shaft 90 between the upper end of the cylindrical member 72 and the bottom of the bracket 74. A spring-loaded lever 112 engages notches 114 to retain the stored shims in the storage position. The same lever 112 engages a similar notch (not shown) angularly offset from the notch 114 when the shim 104 is rotated against the adjustable length member 72 to lock the shim in the working position.

To provide on-site adjustment, the operator rotates the shaft 90 to extend the adjustable length member 72 and raise the bracket 74 from the shims. The lever 112 is pulled against the bias to release the shims 104 for pivoting about the pin 110. Once the desired number of adjusting shims 104 are pivoted away from or into position against the member 72, the operator releases the lever 112, and the lever engages a notch in each one of the shims 104 to lock the shims 104 in their respective working and storage positions. The operator then rotates the threaded shaft 90 to tightly sandwich the adjusting shims 104 between the factory installed pack of shims 102 and the bottom of the bracket 74 to provide the necessary member length for the desired angular adjustment between the rockshaft segments 20a and 20b. The flexible rockshaft joint described above provides a strong, reliable rockshaft joint that is flexible and adjustable and ideally suited for heavy duty operation such as in a multi-section folding agricultural implement.

Figure 5:
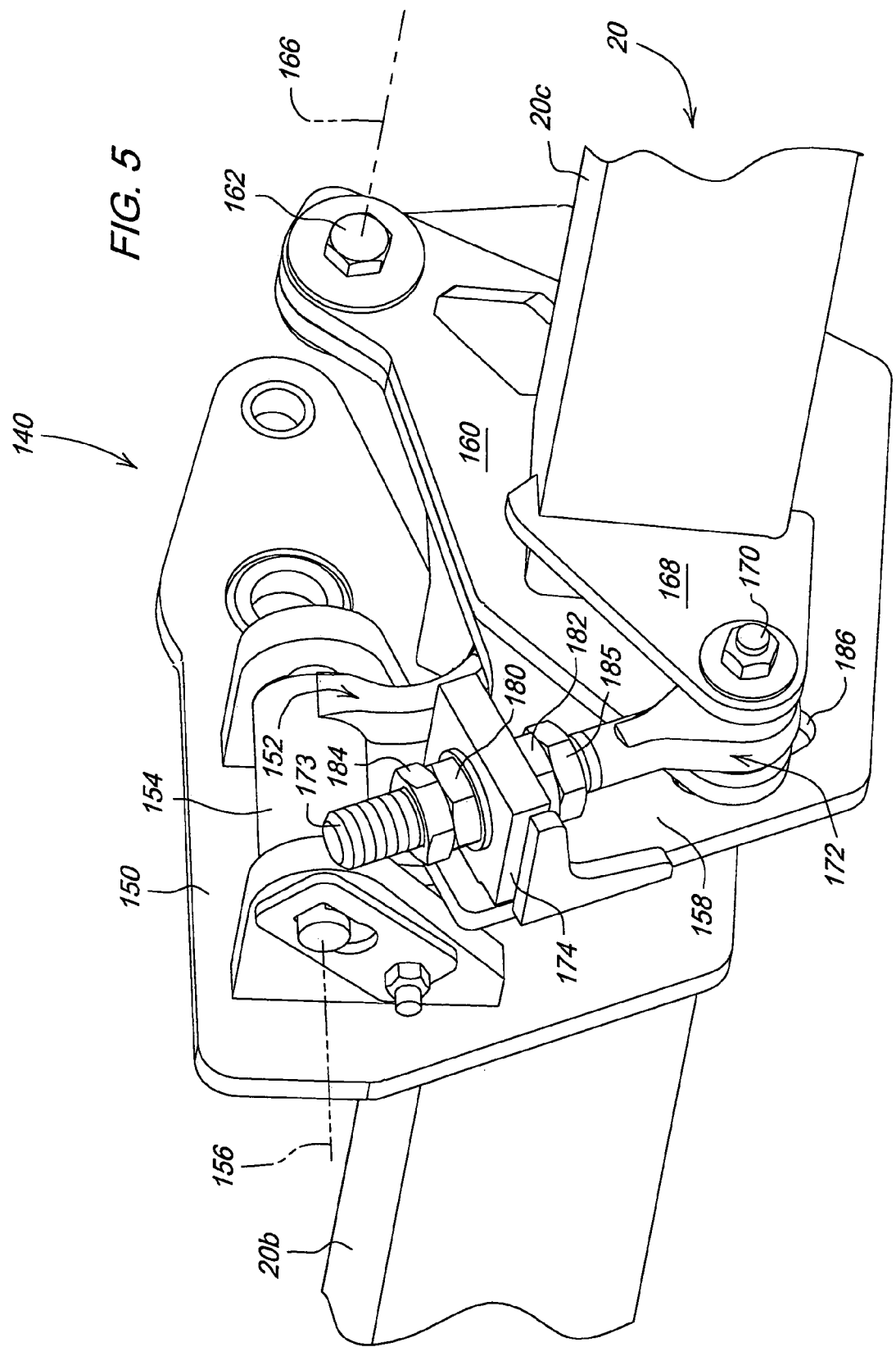
FIG. 5 is a view of an alternate embodiment of a flexible joint.

In an alternate embodiment (FIG. 5) of a flexible joint 140, a first hinge member 150 is connected to the outer end of the rockshaft segment 20b. An adjustment hinge member 152 is connected by a pivot 154 to the first hinge member 150 for rocking relative to the rockshaft segment 20b about a generally fore-and-aft extending pivot axis 156. The hinge member 152 extends downwardly and outwardly from the pivot 154 to a connection with a slotted upright plate 158. A parallel or second plate 160 is pivotally supported from a forward end of the first plate 158 by a pivot pin 162 for rocking about an axis 166 generally parallel to the longitudinal axis of the rockshaft segment 20c. The innermost end of the rockshaft segment 20c is fixed to the outer face of the plate 160. A bracket 168 fixed to the inner end of the rockshaft segment 20c parallel to the plate 160 projects rearwardly to a pivotal connection 170 with a lowermost portion of an eyebolt or adjustable length member 172. The member 172 has an upper end threaded end 173 passing through an aperture in an outwardly projecting bracket 174 fixed to the outer face of the plate 158. Nuts 180 and 182 are threaded onto the end 173 against opposite sides of the bracket 174 and are locked in position by lock nuts 184 and 185. By changing the location of the nuts 180 and 182 on the threaded end 173, the angular position of the rockshaft segment 20b relative to the plate 158, and thus the relative angle between the segments 20*a* and 20*b*, can be adjusted. The pivotal connection 170 includes a bolt and bushing extending through aligned apertures in the bracket 168 and the plate 160 and through a slot 186 in the plate 158. The pivotal connection 170 and operation is similar to that described above with respect to the pivotal connection 70 of FIG. 4.

Having described the preferred embodiment, it will become apparent that various modifications can be made without departing from the scope of the invention as defined in the accompanying claims. For example, although eyebolt and trunnion arrangements are specifically shown, it is to be understood that other types of variable length or adjustment mechanisms could be utilized with the present invention including cylinders and other remotely controlled structures for making angle adjustments automatically on-the-go.

The invention claimed is:

1. Rockshaft structure for a lift system of a multi-section implement adapted for movement in a forward direction over the ground, the rockshaft structure comprising:
    an elongated rockshaft including a first rockshaft segment and a second rockshaft segment;
    a flexible joint connecting ends of the first and second rockshaft segments, the flexible joint facilitating pivotal movement of the implement sections relative to each other from an extended field working position wherein the rockshaft segments lie generally along a rockshaft axis extending transverse to the forward direction, to a folded transport position wherein the rockshaft segments are angled relative to each other, the flexible joint constraining the first and second rockshaft sections for rotation together generally about the rockshaft axis when the frame sections are in the field-working position; and
    wherein the flexible joint includes adjustment structure for selectively rotating the first rockshaft segment relative to the second rockshaft segment generally about the rockshaft axis and changing the relative angular position of the first rockshaft segment and the second rockshaft segment when the implement sections are in the extended field-working position.

2. The rockshaft structure as set forth in claim 1 wherein the flexible joint includes an adjustable length member.

3. The rockshaft structure as set forth in claim 1 wherein the flexible joint includes indexing structure providing incremental adjustment of the angular position of the first rockshaft segment relative to the second rockshaft segment.

4. The rockshaft structure as set forth in claim 3 wherein the indexing structure includes shims.

5. The rockshaft structure as set forth in claim 4 wherein the shims are rotatably mounted on the flexible joint.

6. The rockshaft structure as set forth in claim 2 wherein the adjustable length member includes a threaded shaft supported by the flexible joint.

7. Implement lift system rockshaft structure for a lift system of an implement with first and second frame portions pivotally connected to each other for movement between extended field-working positions and a folded transport position, the rockshaft structure comprising:
    a first rockshaft section rotatably connected to the first frame portion for rotation about a first axis and having a first connecting end;
    a second rockshaft section rotatably connected to the second frame portion for rotation about a second axis and having a second connecting end;
    wherein the first axis and the second axis are generally aligned when the frame portions are in the extended field-working positions;
    a flexible joint connecting the first and second connecting ends and constraining the rockshaft sections for rotation together generally in unison about the first and second axes when the frame portions are in the extended position, the flexible joint facilitating movement of the implement frame portions relative to each other for flexing of the implement while operating or facilitating movement of the frame portions between field-working and transport positions; and
    the flexible joint including means for adjusting the angular position of the first rockshaft section about the first axis relative to the angular position of the second rockshaft section about the second axis.

8. The rockshaft structure as set forth in claim 7 wherein the means for adjusting the angular position comprises an adjustable length member connected to the flexible joint.

9. The rockshaft structure as set forth in claim 7 wherein the means for adjusting the angular position comprises indexing structure providing incremental adjustment of the angular position of the first rockshaft section relative to the second rockshaft section.

10. The rockshaft structure as set forth in claim 9 wherein the indexing structure includes shims.

11. The rockshaft structure as set forth in claim 10 wherein the shims are movably mounted on the flexible joint.

12. The rockshaft structure as set forth in claim 8 wherein the adjustable length member includes a threaded shaft supported by the flexible joint.

13. The rockshaft structure as set forth in claim 8 wherein the adjustable length member includes a telescoping member.

14. The rockshaft structure as set forth in claim 13 further including a plurality of shims movable relative to the telescoping member for adjusting the length of the telescoping member.

15. The rockshaft structure as set forth in claim 7 wherein the flexible joint includes a hinge connecting the sections and wherein the means for adjusting the angular position includes an adjustment member connected for pivoting with one of the sections relative to the other section.

16. The rockshaft structure as set forth in claim 15 wherein the adjustment member includes stackable shims connected to the flexible joint.

17. Multi-section agricultural implement lift system rockshaft structure, the rockshaft structure comprising:
    a first rockshaft segment connected to a first section of the implement;
    a first lift arm connected to the first rockshaft segment;
    a second rockshaft segment connected to a second section of the implement;
    a second lift arm connected to the second rockshaft segment;
    a flex member connecting the first and second rockshaft segments for rotation of the first and second rockshaft segments together generally about a rockshaft axis to change positions of the first and second lift arms, the flex member facilitating pivotal movement of the first and second sections relative to each other; and
    an adjustable link connected between the flex member and one of the first and the second rockshaft segments for changing the angular position of the first rockshaft segment about the rockshaft axis relative to the angular position of the second rockshaft segment about the rockshaft axis and vary the position of the first lift arm relative to the second lift arm.

18. The rockshaft structure as set forth in claim 17 wherein the flex member includes a pivot axis and is rotatable about an axis parallel to the first rockshaft segment, and the adjustable link pivots with the second rockshaft segment about the pivot axis.

19. The rockshaft structure as set forth in claim 18 wherein the adjustable link includes shim structure connected for pivoting relative to the second rockshaft segment.

20. The rockshaft structure as set forth in claim 17 wherein at least one of the rockshaft segments defines a portion of an implement section frame, the adjustable link located adjacent an area of interconnection between implement sections to reduce loading on the adjustable link.

21. The rockshaft structure as set forth in claim 17 wherein the first and second rockshaft segments control height of the first and second sections, respectively, and wherein the changing of the angular position of the first rockshaft segment relative to the second rockshaft segment changes the height of the first section relative to the height of the second section.

22. The rockshaft structure as set forth in claim 21 wherein the first and second rockshaft segments comprise a portion of frame structure for the implement.

23. The rockshaft structure as set forth in claim 19 wherein the shim structure is pivotable between a working position and a storage position, and further including a single lever member for locking the shim structure in either position.

* * * * *